United States Patent [19]

Sturman, Jr. et al.

[11] Patent Number: 5,412,185

[45] Date of Patent: May 2, 1995

[54] INDUCTION HEATING OF POLYMER MATRIX COMPOSITES IN AN AUTOCLAVE

[75] Inventors: Philip C. Sturman, Jr., Rexford, N.Y.; Robert A. Gray, Cincinnati, Ohio

[73] Assignee: General Electric Company, Schenectady, N.Y.

[21] Appl. No.: 160,713

[22] Filed: Nov. 29, 1993

[51] Int. Cl.⁶ ............................................. H05B 6/10
[52] U.S. Cl. ................................. 219/651; 219/649; 219/674; 219/635; 219/602; 264/27
[58] Field of Search ............... 219/647, 651, 659, 675, 219/656, 674, 602, 649, 635; 425/174.8 R, 174; 264/25, 26, 27

[56] References Cited

U.S. PATENT DOCUMENTS

| | | | |
|---|---|---|---|
| 2,151,874 | 3/1939 | Simons | 219/674 |
| 2,341,739 | 2/1944 | Olt | 219/652 |
| 2,930,098 | 3/1960 | Emels | 219/651 |
| 3,180,917 | 4/1965 | Morrison et al. | 219/651 |
| 3,303,258 | 2/1967 | Junker | 219/651 |
| 3,350,494 | 10/1967 | Kunitsky et al. | 219/651 |
| 3,860,737 | 1/1975 | Moscatello | 219/647 |
| 4,704,252 | 11/1987 | Pfaffmann | 219/602 |

*Primary Examiner*—Philip H. Leung
*Attorney, Agent, or Firm*—Patrick R. Scanlon; Paul R. Webb, II

[57] ABSTRACT

Induction heating is utilized to heat polymer matrix composites containing electrically conductive fibers. This is accomplished with an apparatus having a mandrel for supporting a composite workpiece and a helical induction coil disposed around the mandrel. The mandrel, workpiece and induction coil are disposed in an autoclave. The mandrel is a hollow, porous member having a port formed therein which is connected to a vacuum. A vacuum bag is hermetically sealed on the mandrel so as to define an enclosure over the workpiece. A power source is connected to the induction coil and, when activated, causes the coil to generate an oscillating magnetic field lying along the longitudinal axis of the mandrel. The magnetic field induces heat-generating eddy currents in the fibers of the workpiece which are oriented orthogonally to the magnetic field.

17 Claims, 2 Drawing Sheets

INDUCTION HEATING OF POLYMER MATRIX COMPOSITES IN AN AUTOCLAVE

CROSS REFERENCES TO RELATED APPLICATIONS

This application is related to copending applications entitled "Induction Heating of Polymer Matrix Composites in a Mold Press," U.S. Ser. No. 08/160,712 and "Induction Heating of Polymer Matrix Composite Fiber Strands," U.S. Ser. No. 08/160,706, both filed concurrently herewith and assigned to the same assignee as the present invention.

BACKGROUND OF THE INVENTION

This invention relates generally to an apparatus and method for heating polymer matrix composites and more particularly to induction heating of polymer matrix composites containing electrically conductive fibers for the purpose of curing, forming or joining the composite material.

A composite material combines two or more other materials into a single, integrated structure in a manner that the combined materials maintain their original identities. Polymer matrix composites comprise high-strength fibers embedded in a polymeric matrix. The matrix holds the fibers in the proper orientation and protects them from external damage. Polymeric matrix materials fall into two general classes, thermosetting and thermoplastic. The fibers can be configured in many different formats, depending on the intended application of the composite material. Known formats include chopped (molding compound), unidirectional sheet or tape, continuous strands (straight or braided), or woven cloth. Examples of materials typically used for the reinforcing fibers include carbon, graphite, boron and silicon carbide.

Conventional techniques for heating a polymer matrix composite part involve exposing the outer surfaces of the part to an external source of heat. Heat transport to the interior of the part occurs by conduction. This process requires that surface temperatures exceed interior temperatures for some or all of the production cycle. The rate of heating is dependent on this temperature gradient (i.e., the greater the temperature gradient, the faster the part will be fully heated). Since the polymeric matrix will be damaged if exposed to excessive temperature, the heating rate must be restrained (thus lengthening cycle time) so that no portion of the part exceeds the temperature limit.

In addition, some polymers undergo condensation-type chemical reactions during curing which produce volatile reactants. The higher exterior temperatures of conventional heating techniques tend to advance curing at the surface of the part, sometimes forming a hard, impermeable "skin" on the part surface which can trap the volatiles given off during the condensation-type reactions. Trapped volatiles usually result in excessive voids and delaminations, essentially rendering the finished part useless.

Induction heating is one approach which can avoid the above-mentioned disadvantages. Induction heating occurs by exposing a workpiece to an oscillating magnetic field. The magnetic field is typically produced by passing an alternating current through a conducting coil situated near the workpiece. The applied field induces eddy currents in the workpiece, and the eddy currents generate heat by resistive effects. The induced eddy currents generally flow perpendicular to the applied magnetic field and tend to roughly mimic the coil current. Thus, to be susceptible to induction heating, the workpiece must be electrically conductive and be able to define electric paths which approximate the shape of the coil. Isotropic workpieces such as metallic plates easily meet these requirements even with spiral coils, but other workpieces are less susceptible to conventional induction heating.

Polymer matrix composites containing electrically conductive fibers could conduct electric currents, but the currents are essentially restricted to the electrically conductive fibers because of the high resistivity of the polymeric matrix material. Thus, composites lacking fibers which are oriented orthogonally to the applied magnetic field could not be heated by induction. For instance, a single sheet of unidirectional fiber reinforced composite would not be heated by a spiral coil because the unidirectional fibers could not conduct eddy currents in all of the orthogonal directions of the spiral coil.

Accordingly, there is a need for an apparatus and method for heating polymer matrix composites by induction heating, thereby rapidly heating the composites without the large temperature gradients necessary with conventional conductive heating.

SUMMARY OF THE INVENTION

The above-mentioned needs are met by the present invention which utilizes induction heating to heat polymer matrix composites containing electrically conductive fibers. Specifically, the present invention provides an apparatus comprising a mandrel for supporting a polymer matrix composite workpiece and a helical induction coil which is positioned with respect to the mandrel so that the longitudinal axes of the mandrel and the induction coil substantially coincide. The mandrel, workpiece and induction coil are disposed in an autoclave. A power source is connected to the induction coil to energize the coil. The mandrel comprises a hollow, porous support member having a port formed therein which is connected to a vacuum. A vacuum bag is hermetically sealed to the support member so as to define an enclosure over the workpiece. Liners such as glass mats may be disposed around the workpiece.

In operation, the workpiece is placed on the mandrel so that at least some of the fibers in the workpiece are oriented in a direction perpendicular to the longitudinal axis of the mandrel. The power source is then activated so that the coil generates an oscillating magnetic field which is oriented along the longitudinal axis. The workpiece, being in the magnetic field, is thus heated by eddy currents generated in the fibers oriented orthogonally to the field. During the heating process, the vacuum is operated to remove air from the enclosure, thus creating a vacuum which tends to hold the workpiece against the mandrel. The pressure in the autoclave also acts to maintain the workpiece in place on the mandrel.

By using induction heating, the present invention is able reduce heating time without the large temperature gradients of conventional processes. Consequently, composite laminates can be quickly cured without excessive voids and post-cure delaminations. The use of induction heating also produces short cycle times because only the workpiece (and not any supporting structure) is directly heated. Moreover, the present invention provides for rapid heating of composite parts without the need for artificial susceptors (e.g., metallic particles or screens). This is advantageous because besides the obvious weight penalty, such susceptors may compromise the mechanical properties and inspectability of the parts.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
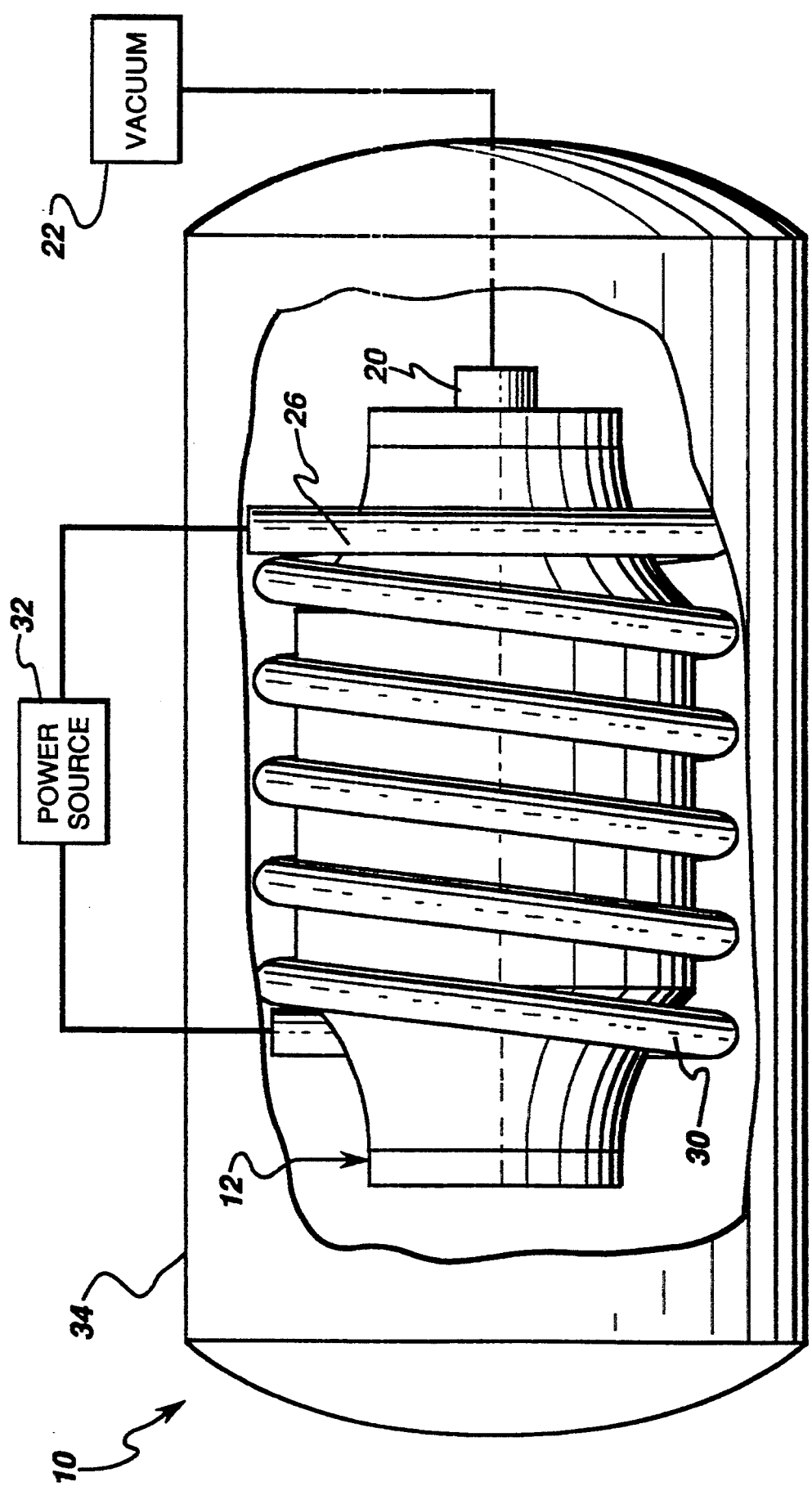
FIG. 1 is a partially cutaway side view of the induction heating apparatus of the present invent ion.
Figure 2:
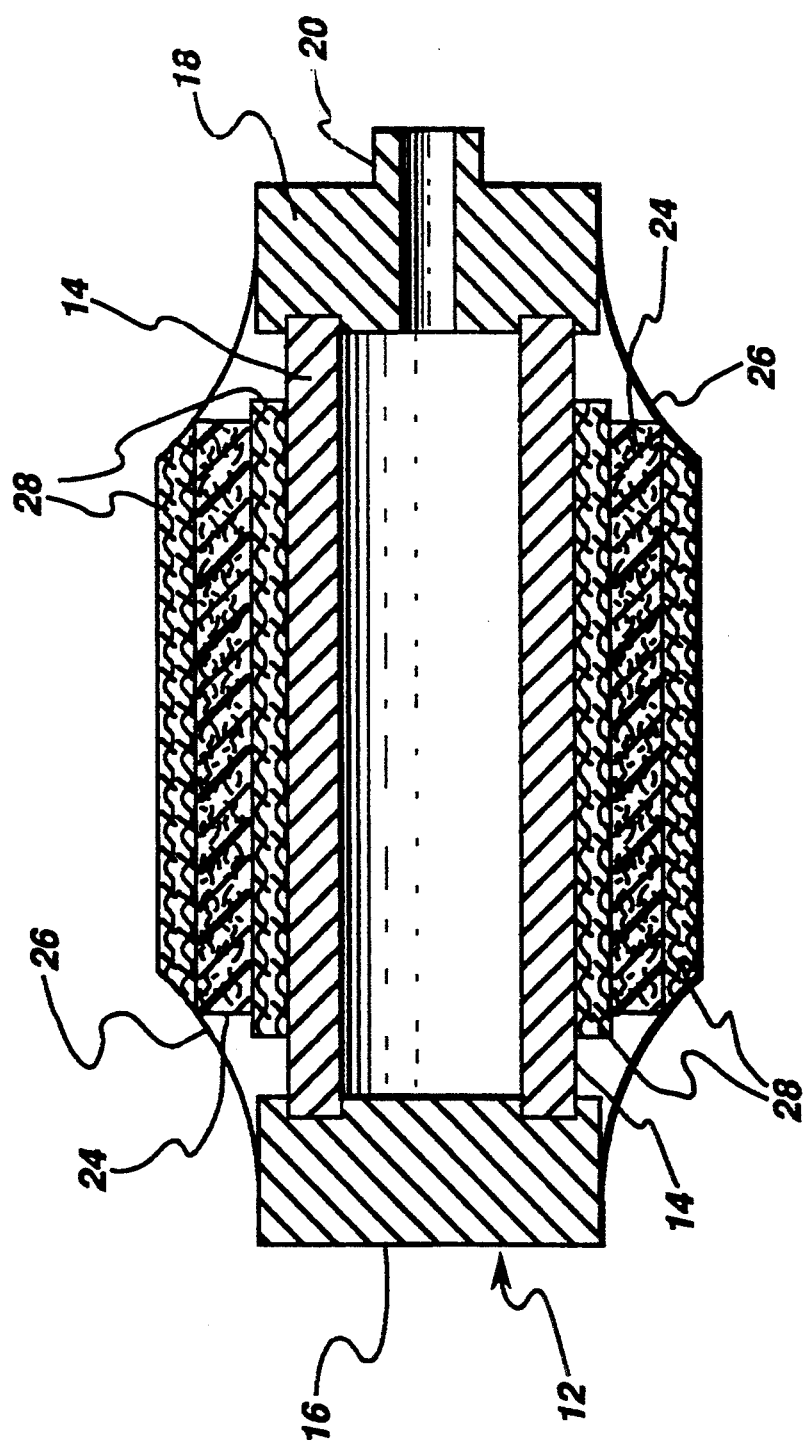
FIG. 2 is a cross-sectional view of the workpiece holding means of the present invention.

Referring to the drawings wherein identical reference numerals denote the same elements throughout the various views, FIG. 1 shows an apparatus 10 for heating a polymer matrix composite containing electrically conductive fibers. The apparatus 10 includes a mandrel 12. As seen in FIG. 2, the mandrel 12 comprises a hollow support member 14 having first and second end caps 16,18 attached to the opposing ends thereof. The support member 14 is preferably cylindrical, although other configurations are possible. The support member 14 and the end caps 16, 18 are made of a material, such as ceramic, which is capable of withstanding high temperatures and does not conduct electricity. The support member 14 is porous so as to permit gas flow therethrough; the end caps do not permit gas flow therethrough. A vacuum port 20 is formed in the second end cap 18 to provide fluid communication to the hollow interior of the support member 14. The vacuum port 20 is connected to a vacuum 22.

A polymer matrix composite workpiece 24 is disposed around the outer surface of the support member 14. The composite workpiece 24 comprises a polymeric matrix embedded with fibers made of an electrically conducting material. Suitable fiber materials include carbon (particularly amorphous carbon and graphite) and some metals. The fibers are preferably in the form of woven cloths or unidirectional sheets or tapes because these fiber formats provide good electrical conducting paths. Theoretically, a composite workpiece having chopped fibers could be used but the composite material would have to be carefully prepared to ensure that sufficient electrical contact between the fibers existed. The workpiece 24 completely surrounds the support member 14 and is situated thereon so that at least some of the fibers are oriented in a circumferential direction with respect to the support member 14. The circumferentially oriented fibers thus form electrical conducting paths around the support member 14 which are perpendicular to its longitudinal axis.

A vacuum bag 26, preferably made of a strong, pliable material such as polyimide film, is disposed on the mandrel 12 so as to completely cover the workpiece 24. The ends of the vacuum bag 26 are hermetically sealed to the outer circumferential surfaces of the respective end pieces 16, 18. Thus, the vacuum bag 26 defines an air tight enclosure over the workpiece 24. Liners 28, such as glass mats or the like may optionally be placed between the workpiece 24 and the support member 14 and between the workpiece 24 and the vacuum bag 26. The liners 28 can thus function like sponges to absorb excess resin material from the workpiece 24 and can also thermally insulate the workpiece 24.

An elongated helical induction coil 30 is disposed around the mandrel 12 so that the longitudinal axes of the induction coil 30 and the mandrel 12 substantially coincide. The turns of the coil 30 circle the mandrel 12 in a direction substantially perpendicular to the mandrel's longitudinal axis. Although the coil 30 is shown as being outside of the workpiece 24, it could also be located inside the mandrel 12 or embedded in the workpiece 24. Embedding the coil 30 in the workpiece 24 facilitates magnetic field penetration and is thus useful where magnetic field penetration by a remote coil is limited, such as with particularly thick workpieces. However, this will result in the coil becoming a component of the finished part.

The coil 30 is an electrical conductor (e.g., copper) capable of carrying sufficiently large currents. The coil 30 may be made of hollow tubing so that a coolant such as water can be passed therethrough. The mandrel 12 is held by supports (not shown) so that the workpiece 24 (or the portion thereof intended to be heated) is positioned entirely within the magnetic field generated by the coil 30. The induction coil 30 is connected to an AC power source 32 capable of producing an alternating current in a frequency range suitable for induction heating.

The entire assemblage of the mandrel 12, workpiece 24 and induction coil 30 is disposed within an autoclave 34 which provides a controlled pressure environment. The autoclave 34 includes conduits for the vacuum lines which connect the vacuum port 20 to the vacuum 22 and for the power lines from the power source 32. Conduits can also be included for thermocouple leads from thermocouples (not shown) which are provided for monitoring the temperature of the workpiece 24.

In operation, the power source 32 is activated so as to deliver an alternating current to the induction coil 30 which in turn generates an oscillating magnetic field lying substantially along the longitudinal axes of the mandrel 12 and the coil 30. The power source 32 operates at a frequency which is suitable for induction heating and complies with industry standards and regulations. The magnetic field generates eddy currents in the fibers of the workpiece 24 that are oriented orthogonally to the magnetic field, i.e., those fibers which form an electric circuit about the circumference of the mandrel 12. It has been found that only a small amount of circumferentially oriented fibers is required to provide the dissipation necessary to heat the workpiece 24. At the same time as the power source 32 is activated, the vacuum 22 is operated to remove air from the vacuum port 20. Due to the porosity of the support member 14, this creates a vacuum or reduced pressure in the enclosure defined by the vacuum bag 26 which tends to force the workpiece 24 against the support member 14. The pressure in the autoclave 34 also acts to maintain the workpiece 24 in place on the mandrel 12 during the heating operation. The oscillating magnetic field is maintained long enough to achieve the desired degree of heating.

The foregoing has described a method and apparatus which use induction heating to heat polymer matrix composites containing electrically conductive fibers. While specific embodiments of the present invention have been described, it will be apparent to those skilled in the art that various modifications thereto can be made without departing from the spirit and scope of the invention as defined in the appended claims.

What is claimed is:

1. An apparatus for heating a polymer matrix composite workpiece, said apparatus comprising:
   a mandrel for supporting said workpiece, said mandrel comprising a hollow, support member made of a porous material and having a longitudinal axis andante outer workpiece-supporting surface;
   a helical induction coil having a longitudinal axis, said longitudinal axis of said induction coil substantially coinciding with said longitudinal axis of said support member; and
   a power source connected to said induction coil.

2. The apparatus of claim 1 further comprising an autoclave, said mandrel and said induction coil being disposed in said autoclave.

3. The apparatus of claim 1 wherein said mandrel further comprises first and second end caps attached to opposing ends of said support member.

4. The apparatus of claim 3 wherein said first end cap has a port formed therein, said apparatus further comprising a vacuum connected to said port.

5. The apparatus of claim 4 further comprising a vacuum bag hermetically sealed to said first and second end caps so as to enclose said workpiece.

6. The apparatus of claim 5 further comprising liners disposed around said workpiece.

7. The apparatus of claim 3 wherein said support member and said first and second end caps are all made of a material which does not conduct electricity.

8. An apparatus for heating a polymer matrix composite workpiece, said apparatus comprising:
   a mandrel for supporting said workpiece, said mandrel comprising a hollow support member made of a porous material and having an outer workpiece-supporting surface;
   a helical induction coil disposed around said mandrel; and
   a power source connected to said induction coil.

9. The apparatus of claim 8 further comprising an autoclave, said mandrel and said induction coil being disposed in said autoclave.

10. The apparatus of claim 8 wherein said mandrel further comprises first and second end caps attached to opposing ends of said support member.

11. The apparatus of claim 10 wherein said first end cap has a pore formed therein, said apparatus further comprising a vacuum connected to said port.

12. The apparatus of claim 11 further comprising a vacuum bag hermetically sealed to said first and second end caps so as to enclose said workpiece.

13. The apparatus of claim 12 further comprising liners disposed around said workpiece.

14. The apparatus of claim 10 wherein said support member and said first and second end caps are all made of a material which does not conduct electricity.

15. A method for heating a polymer matrix composite workpiece having electrically conductive fibers, said method comprising the steps of:
   placing said workpiece on a mandrel having a longitudinal axis so that at least some of said fibers are oriented in a direction perpendicular to said longitudinal axis; and
   exposing said workpiece to an oscillating magnetic field which is oriented along said longitudinal axis.

16. The method of claim 15 further comprising the steps of:
   sealing a vacuum bag to said mandrel so as to define an enclosure over said workpiece; and
   removing air from said enclosure.

17. The method of claim 16 further comprising the step of placing said mandrel and said workpiece in an autoclave.

* * * * *